(12) United States Patent
Yoder (10) Patent No.: US 7,946,942 B2
(45) Date of Patent: May 24, 2011

(54) POWER PIVOT DEVICE

(75) Inventor: Bryan Yoder, Corvallis, OR (US)

(73) Assignee: Warn Industries, Inc., Milwaukie, OR (US)

( * ) Notice: Subject to any disclaimer, the term of this patent is extended or adjusted under 35 U.S.C. 154(b) by 1027 days.

(21) Appl. No.: 11/756,154

(22) Filed: May 31, 2007

(65) Prior Publication Data
US 2008/0298885 A1 Dec. 4, 2008

(51) Int. Cl.
*F16H 35/02* (2006.01)
(52) U.S. Cl. .................. 475/14; 475/149; 192/223.1
(58) Field of Classification Search .......... 475/14, 475/149; 192/223.1
See application file for complete search history.

(56) References Cited

U.S. PATENT DOCUMENTS

| 3,976,172 A * | 8/1976 | F'Geppert ................. 192/223.1 |
| 4,448,098 A * | 5/1984 | Totsu ............................. 81/467 |
| 6,334,269 B1 | 1/2002 | Dilks |

\* cited by examiner

*Primary Examiner* — David D Le
*Assistant Examiner* — Derek D Knight
(74) *Attorney, Agent, or Firm* — Harness, Dickey & Pierce, P.L.C.

(57) ABSTRACT

A pivot assembly may include first and second subassemblies. The first subassembly may be adapted to be coupled to a frame member and rotationally fixed relative thereto. The first subassembly may include a latch mechanism displaceable between locked and unlocked positions. The second subassembly may be adapted to be coupled to the frame member and may be rotatable relative thereto. The second subassembly may include a power pivot assembly and a cam member. The power pivot assembly may be drivingly engaged with the cam member and operable to rotate the cam member in a first rotational direction to a first position where the cam member urges the latch mechanism into the unlocked position.

19 Claims, 7 Drawing Sheets

POWER PIVOT DEVICE

FIELD

The present disclosure relates to pivot assemblies, and more specifically to power actuated pivot assemblies.

BACKGROUND

The statements in this section merely provide background information related to the present disclosure and may not constitute prior art.

Plow systems are commonly used for all-terrain vehicles (ATVs). Current plow systems can require the driver to get off of the vehicle to adjust the pivot angle of the plow blade. A variety of other maintenance equipment used in combination with tractors and/or ATVs, such as lawn cutting and sweeper assemblies, can require a user to manually adjust a rotary orientation of the maintenance equipment.

SUMMARY

Accordingly, a pivot assembly may include first and second subassemblies. The first subassembly may be adapted to be coupled to a frame member and rotationally fixed relative thereto. The first subassembly may include a latch mechanism displaceable between locked and unlocked positions. The second subassembly may be adapted to be coupled to the frame member and may be rotatable relative thereto. The second subassembly may include a power pivot assembly and a cam member. The power pivot assembly may be drivingly engaged with the cam member and operable to rotate the cam member in a first rotational direction to a first position where the cam member urges the latch mechanism into the unlocked position.

An alternate pivot assembly may include a rotating member, a latch mechanism, and a power pivot assembly. The rotating member may be adapted to be rotatably coupled to a frame member. The latch mechanism may be adapted to be coupled to the frame member and may be displaceable between first and second positions. The latch mechanism may be engaged with the rotating member when in the first position to prevent relative rotation between the rotating member and the frame member. The latch mechanism may be disengaged from the rotating member when in the second position to allow relative rotation between the rotating member and the frame member. The power pivot assembly may include a drive assembly drivingly coupled to the rotating member and operable to displace the latch mechanism between the first and second positions.

The power pivot assembly may include a motor, a planetary gear assembly, and a housing having a splined inner surface. The motor may be drivingly coupled to the planetary gear assembly and the planetary gear assembly may be engaged with the splined inner surface. The planetary gear assembly is operable to displace the latch mechanism to the second position and to rotate the rotating member relative to the frame member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
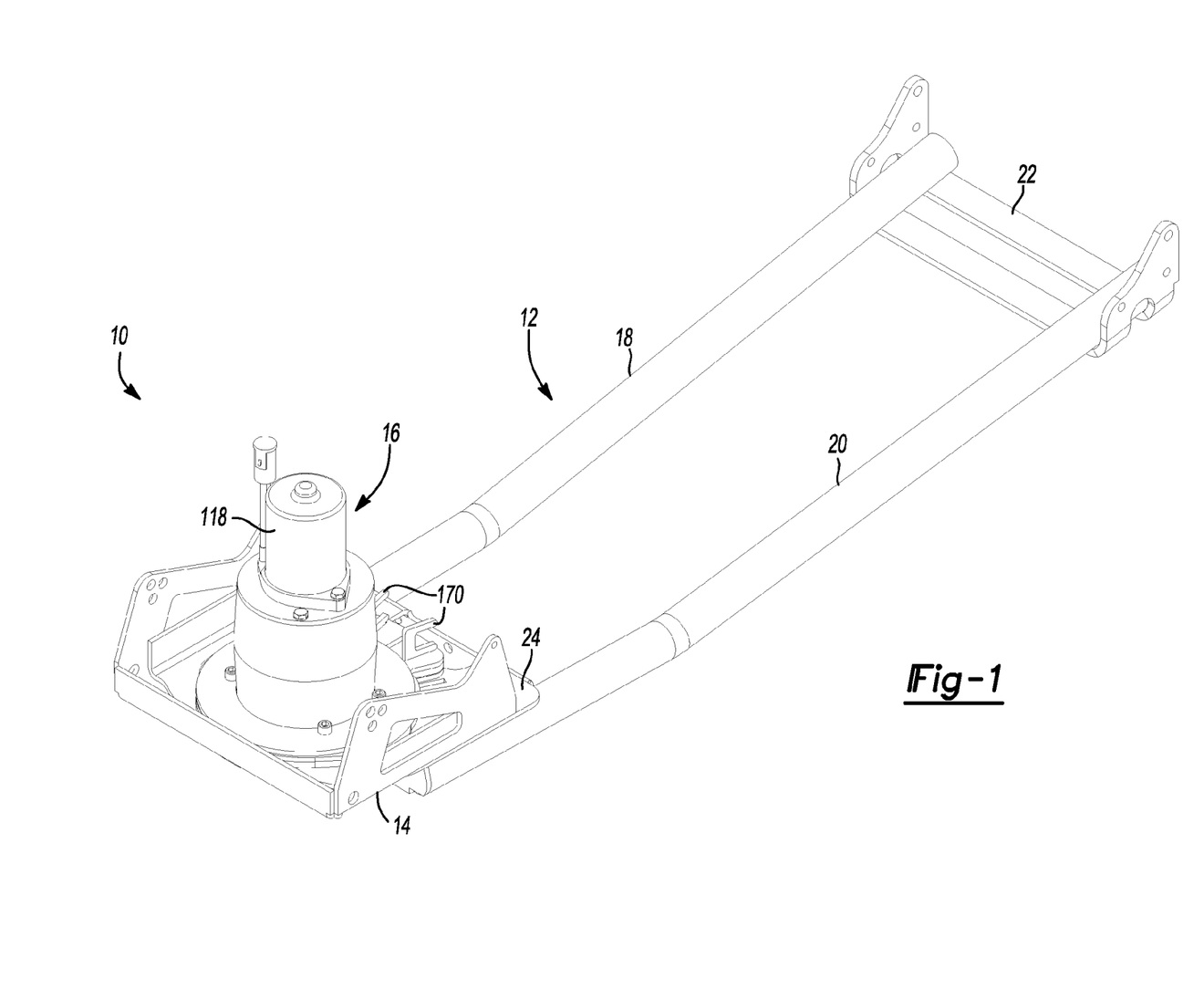
FIG. 1 is a perspective view of a plow mount assembly according to the present disclosure.

With reference to FIG. 1, a plow mount assembly 10 may include a frame assembly 12, a base swivel 14, and a power pivot assembly 16. Frame assembly 12 may include a series of tubular frame members 18, 20, a vehicle mounting bracket 22, and a base plate 24. Vehicle mounting bracket 22 may provide for mounting of frame assembly 12 to a vehicle and base plate 24 may support base swivel 14 and power pivot assembly 16 thereon, as discussed below. With additional reference to FIGS. 2 and 3, plow mount assembly 10 may further include first, second and third bearing plates 26, 28, 30, a coupling plate 31, first and second stop members 32, 34, first and second support members 36, 38, first and second pivot arms 40, 42 forming a latch mechanism, a lock plate assembly 44, a drive plate 46 and a cam member 48.

Figure 3:
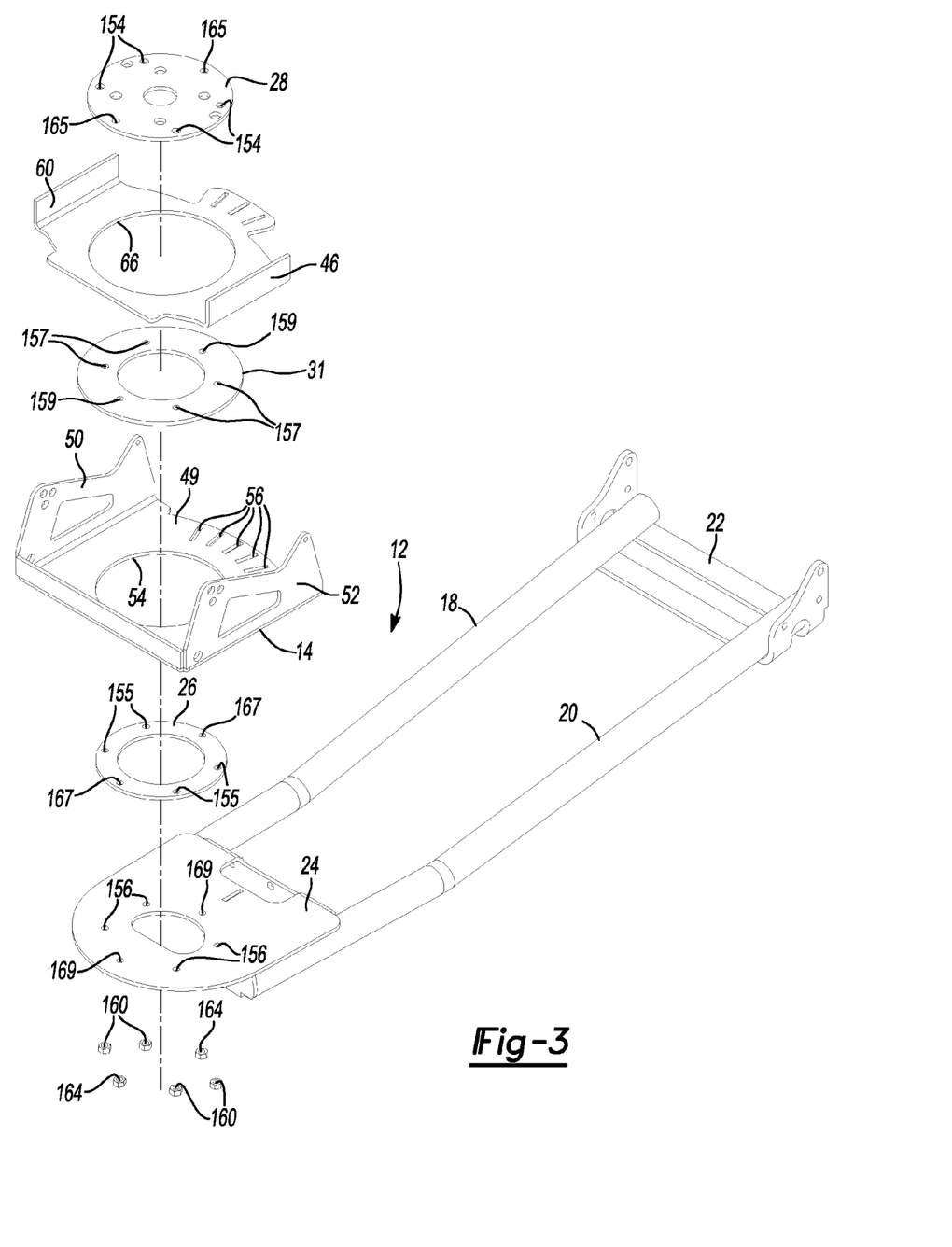
FIG. 3 is a perspective exploded view of a portion of the plow mount assembly of FIG. 1.

As best shown in FIG. 3, base swivel 14 may include a plate member 49 having arms 50, 52 extending upwardly from opposite sides thereof. Plate member 49 may include a central aperture 54 and a series of slots 56 extending therethrough. Aperture 54 may be generally circular and may have a diameter similar to an outer diameter of first bearing plate 26. Base swivel 14 may be disposed adjacent to the upper surface of base plate 24, having first bearing plate 26 disposed within aperture 54, such that base swivel 14 is rotatable relative to base plate 24 about first bearing plate 26. Coupling plate 31 may be disposed between base swivel 14 and drive plate 46.

Drive plate 46 may be disposed adjacent to an upper surface of base swivel 14 and may include a plate member 58 having arms 60, 62 extending upwardly from opposite sides thereof and a flange portion 64 extending from a side between arms 60, 62. Arms 60, 62 may generally oppose inner surfaces of arms 50, 52 of plate member 49. Plate member 58 may include a central aperture 66 extending therethrough and a series of slots 68 extending through flange portion 64 and generally aligned with slots 56 in plate member 49. Aperture 66 may be generally circular and may have a diameter similar to an outer diameter of second bearing plate 28. Second bearing plate 28 may be disposed within aperture 66, such that drive plate 46 is rotatable thereabout.

Figure 2:
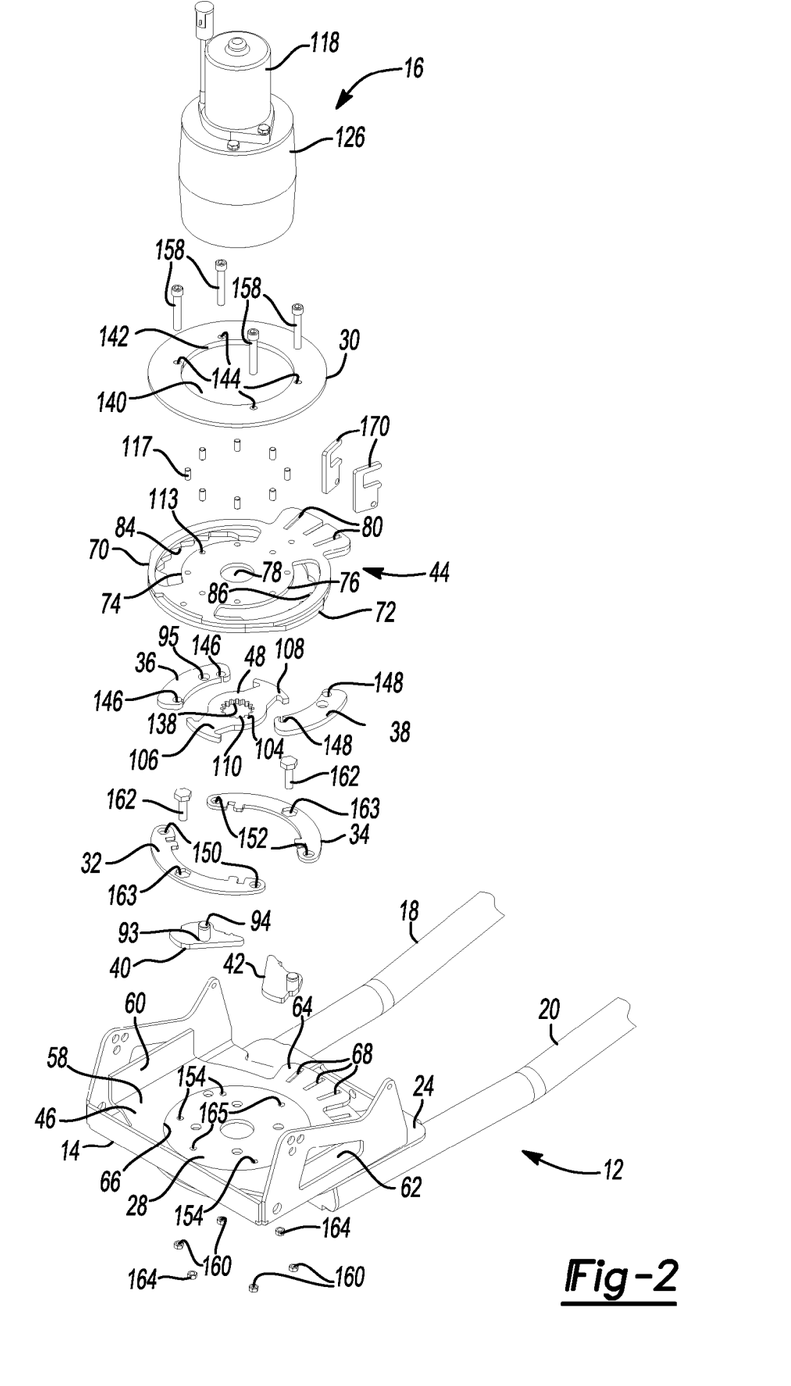
FIG. 2 is a fragmentary perspective exploded view of the plow mount assembly of FIG. 1.
Figure 5:
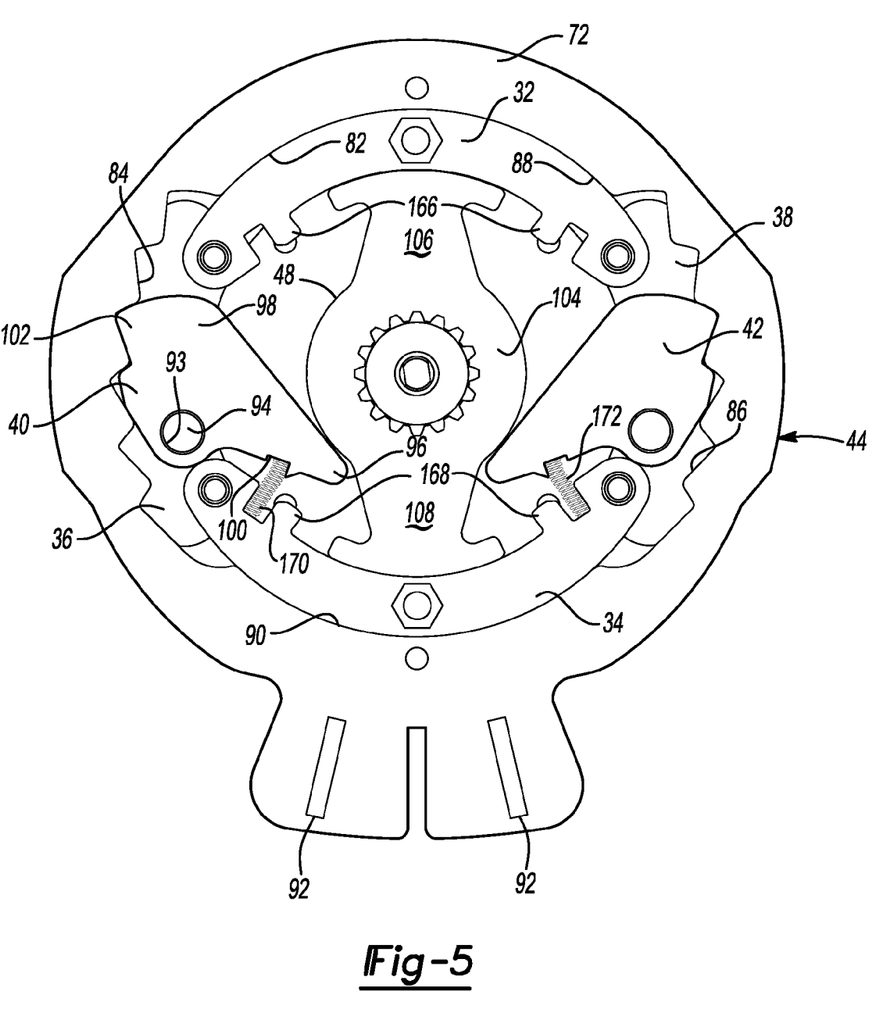
FIG. 5 is a bottom plan view of a portion of the plow mount assembly of FIG. 1 in a first position.

With additional reference to FIGS. 2 and 5, lock plate assembly 44 may be disposed adjacent to an upper surface of drive plate 46 and may include first and second plates 70, 72 fixed to one another. First plate 70 may include first and second arcuate-shaped apertures 74, 76 generally opposite one another, a central aperture 78, and a series of slots 80 extending therethrough and aligned with slots 68 in drive plate 46. Second plate 72 may include a generally circular central opening 82 having first and second sets of teeth 84, 86 generally opposite one another formed on an inner circumference thereof adjacent first and second arcuate portions 88, 90. Second plate 72 may further include a series of slots 92 extending therethrough and aligned with slots 80 in first plate 70.

First and second stop members 32, 34, first and second support members 36, 38, first and second pivot arms 40, 42, and cam member 48 may be disposed within lock plate assembly 44. More specifically, stop members 32, 34 may have generally arcuate bodies and may be disposed adjacent to arcuate portions 88, 90 of second plate 72. Outer circumferential surfaces of stop members 32, 34 may form bearing and guide surfaces for rotation of lock plate assembly 44 thereabout, as discussed below. First and second support members 36, 38 may have generally arcuate bodies and may be disposed within first and second arcuate-shaped apertures 74, 76 of first plate 70. Outer and inner circumferential surfaces of support members 36, 38 may form bearing and guide surfaces for rotation of lock plate assembly 44 thereabout, as discussed below. First and second pivot arms 40, 42 may be disposed within second plate 72 adjacent to first and second sets of teeth 84, 86, best shown in FIG. 5.

First and second pivot arms 40, 42 may be generally similar to one another, therefore, only first pivot arm 40 will be discussed in detail with the understanding that the description applies equally to second pivot arm 42. First pivot arm 40 may include an aperture 93 having a pin 94 extending therethrough and through an aperture 95 in first support member 36, rotatably coupling first pivot arm 40 thereto. First pivot arm 40 may further include first and second end portions 96, 98. First end portion 96 may include a recess 100 therein and second end portion 98 may include teeth 102 for engagement with teeth 84 in second plate 72, as discussed below.

Cam member 48 may be disposed within a central portion of second plate 72 and may include a central portion 104 having first and second arms 106, 108 extending radially outwardly therefrom. Central portion 104 may include an aperture 110 (FIG. 2) generally aligned with aperture 78 in first plate 70. Arms 106, 108 may include arcuate radially outer surfaces for slidable engagement with arcuate inner surfaces of stop members 32, 34, as discussed below.

Figure 4:
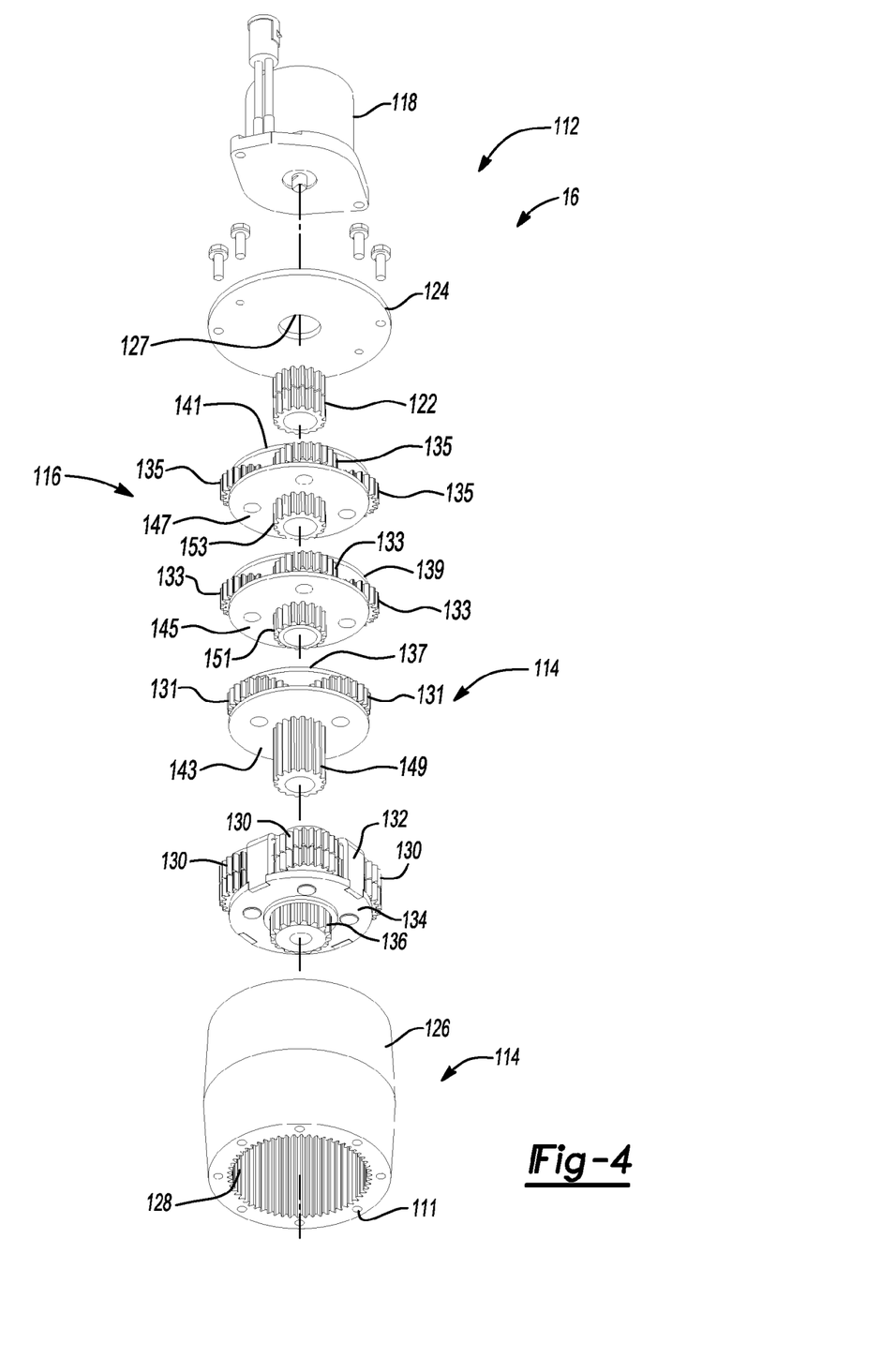
FIG. 4 is a perspective exploded view of a power pivot assembly of the plow mount assembly of FIG. 1.

With additional reference to FIG. 2, power pivot assembly 16 may be disposed adjacent to an upper surface of lock plate assembly 44. As shown in FIG. 4, power pivot assembly 16 may include a motor assembly 112, a gear housing assembly 114, and a gear assembly 116. Motor assembly 112 may include a motor 118 and a drive gear 122. Drive gear 122 may be in a driven engagement with motor 118. Gear housing assembly 114 may include an end plate 124 and a gear housing 126. End plate 124 may be fixed to an upper portion of gear housing 126 and may have motor 118 fixed thereto. End plate 124 may include an aperture 127 allowing engagement between motor 118 and drive gear 122. Gear housing 126 may include a generally cylindrical body having a splined inner surface 128, which may operate as a ring gear, as discussed below.

Gear assembly 116 may include a series of compound planetary gears 130, 131, 133, 135 rotatably coupled to respective cages 132, 137, 139, 141. Cages 132, 137, 139, 141 each may include lower plates 134, 143, 145, 147 having driven gears 136, 149, 151, 153 coupled thereto for rotation therewith. Planetary gears 130, 131, 133, 135 may be engaged with splined inner surface 128 of gear housing 126, as discussed below. Driven gear 136 may extend axially beyond gear housing 126 and may be drivingly engaged with cam member 48. More specifically, aperture 110 in cam member 48 may include a splined inner surface 138 engaged with driven gear 136, causing rotation of cam member 48 with driven gear 136, as discussed below.

Gear housing 126 (FIG. 4) may include a series of apertures 111 aligned with a series of apertures 113 in first plate 70 (FIG. 2). Pins 117 (FIG. 2) may be located in apertures 111 and apertures 113, fixing first plate 70 for rotation with gear housing assembly 114, as discussed below. Third bearing plate 30 may include a central aperture 140 having gear housing 126 located therein. A circumferential surface 142 of aperture 140 may provide a bearing surface for gear housing 126, as discussed below.

Third bearing plate 30 may include a series of apertures 144 disposed about a circumferential portion thereof and aligned with a series of apertures 146, 148 in support members 36, 38, a first series of apertures 150, 152 in stop members 32, 34, a first series of apertures 154 in second bearing plate 28, a first series of apertures 157 in coupling plate 31, a first series of apertures 155 in first bearing plate 26, and a first series of apertures 156 in base plate 24. A first series of fasteners 158 may pass through apertures 144, 146, 148, 150, 152, 154, 155, 156, 157 and may receive nuts 160 on ends thereof, fixing first, second and third bearing plates 26, 28, 30, first and second stop members 32, 34, and first and second support members 36, 38 to base plate 24.

More specifically, first series of apertures 157 in coupling plate 31 may include a threading. First series of fasteners 158 may threadingly engage first series of apertures 157. Power pivot assembly 16, third bearing plate 30, lock plate assembly 44, first and second support members 36, 38, cam member 48, first and second stop members 32, 34, stop first and second pivot arms 40, 42, second bearing plate 28, drive plate 46, and coupling plate 31 may be fixed to one another by the threaded engagement between first series of fasteners 158 and coupling plate 31. Threaded ends of fasteners 158 may pass though apertures 155 in first bearing plate 26 and apertures 156 in base plate 24. Fasteners 158 may then receive nuts 160 on ends thereof. Therefore, first, second and third bearing plates 26, 28, 30, first and second stop members 32, 34, first and second support members 36, 38 may form a first subassembly that is rotationally fixed relative to base plate 24.

A second set of fasteners 162 may extend through a second series of apertures 163 in stop members 32, 34, a second series of apertures 165 in second bearing plate 28, a second series of apertures 159 in coupling plate 31, a second series of apertures 167 in first bearing plate 26, and a second series of apertures 169 in base plate 24. Second set of fasteners 162 may receive nuts 164 on ends thereof, further securing stop members 32, 34, second bearing plate 28, and first bearing plate 26 to base plate 24. Base swivel 14, power pivot assembly 16, lock plate assembly 44, drive plate 46, and cam member 48 may be rotatable relative to base plate 24 and may form a second subassembly that is rotatable relative to base plate 24, as discussed below. Base swivel 14, lock plate assembly 44, and drive plate 46 may form a plow rotating member.

With reference to FIG. 5, an initial orientation of lock plate assembly 44 is illustrated and generally corresponds to a straight orientation of base swivel 14 seen in FIG. 1. In the initial orientation, cam member 48 is generally centered between stops 166, 168 of stop members 32, 34 and teeth 102 of pivot arms 40, 42 are biased into engagement with teeth 84 in second plate 72 through biasing members 170, 172 acting on pivot arms 40, 42. In this initial orientation, lock plate assembly 44 is generally rotatably fixed relative to base plate 24 since pivot arms 40, 42 are coupled to support members 36, 38 which are fixed to base plate 24. However, lock plate assembly 44 may be rotated in either a clockwise or counterclockwise direction, as discussed below. For exemplary purposes, rotation of lock plate assembly 44 in the counterclockwise direction is discussed below.

Figure 6:
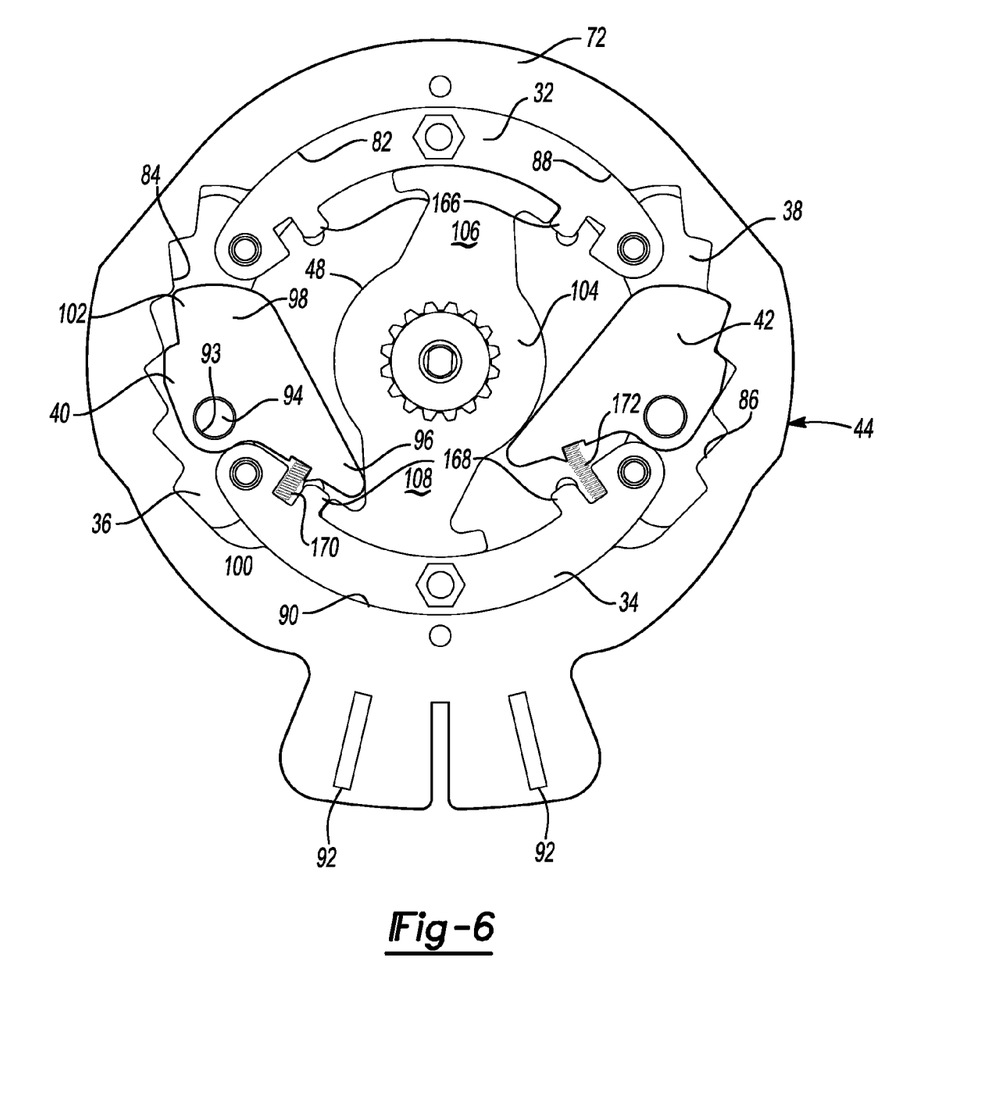
FIG. 6 is a bottom plan view of a portion of the plow mount assembly of FIG. 1 in a second position.

Motor 118 may rotate drive gear 122 in a clockwise direction. When drive gear 122 is rotated in a clockwise direction, planetary gears 130, 131, 133, 135 are rotated in a counterclockwise direction. Since lock plate assembly 44 is generally rotationally fixed by pivot arms 40, 42 when in the initial orientation, planetary gears 130, 131, 133, 135 may drive cages 132, 137, 139, 141, and therefore driven gears 136, 149, 151, 153 and cam member 48, in a clockwise direction. When driven in the clockwise direction, cam member 48 will eventually abut stops 166, 168 on stop members 32, 34 (seen in FIG. 6), preventing further rotation of cages 132, 137, 139, 141 and cam member 48 relative to base plate 24. When cam member 48 abuts stops 166, 168, arm 108 of cam member 48 may engage pivot arm 40, biasing teeth 102 thereof out of engagement with teeth 84 of second plate 72. Lock plate assembly 44 may then be rotated in a counterclockwise direction.

As drive gear 122 continues to rotate in a clockwise direction, planetary gears 130, 131, 133, 135 continue to rotate in a counterclockwise direction. However, since cage 132 is fixed against rotation in the clockwise direction due to the engagement between cam member 48 and stop members 32, 34, gear housing 126 is rotated. More specifically, as planetary gears 130, 131, 133, 135 rotate in the counterclockwise direction, the engagement between planetary gears 130, 131, 133, 135 and splined inner surface 128 of gear housing 126 drives gear housing 126 in the counterclockwise direction. Since gear housing 126 is rotationally fixed to lock plate assembly 44, rotation of gear housing 126 causes rotation of lock plate assembly 44 as well. Rotation of lock plate assembly 44 may be further translated to drive plate 46 through a series of pins 170 (FIG. 2).

More specifically, slots 80, 92 in first and second plates 70, 72 may be aligned with slots 68 in drive plate 46 and slots 56 in base swivel 14. Pins 170 may extend into slots 80, 92, 68, 56, fixing drive plate 46 and base swivel 14 for rotation with gear housing 126. Pins 170 may be removed, allowing rotation of lock plate assembly 44 without any corresponding rotation of drive plate 46 or base swivel 14.

Lock plate assembly 44 may be returned to the initial orientation corresponding to a generally straight orientation of base swivel 14 shown in FIG. 5 by rotating drive gear 122 in a counterclockwise direction. More specifically, since pivot arm 42 is engaged with teeth 82 in second plate 72, lock plate assembly 44 is prevented from rotating in a clockwise direction. Therefore, when drive gear 122 is rotated in a counterclockwise direction while cam member 48 is engaged with stops 166, 168, cam member 48 is rotated in a counterclockwise direction. Once cam member 48 is generally centered between stops 166, 168 lock plate assembly 44 is once again oriented in the initial position discussed above. While clockwise rotation of drive gear 122 has been discussed, it is understood that counterclockwise rotation of drive gear 122 will result in opposite clockwise rotation of base swivel 14.

Figure 7:
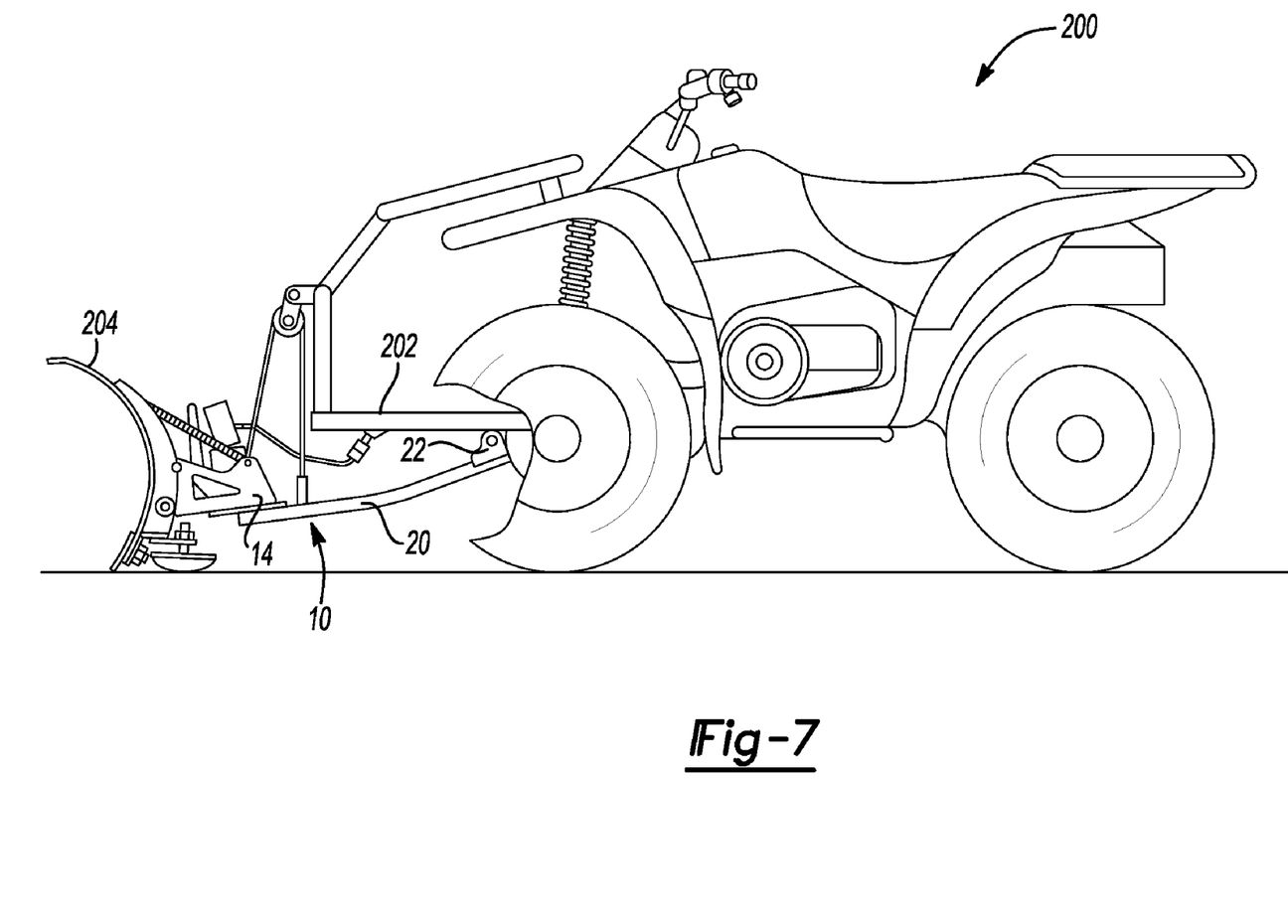
FIG. 7 is a side view of the plow mount assembly.

With reference to FIG. 7, plow mount assembly 10 may be mounted to a vehicle, such as a utility vehicle 200. Vehicle mounting bracket 22 of plow mount assembly 10 may be coupled to a frame 202 of vehicle 200. More specifically, vehicle mounting bracket 22 may be laterally fixed relative to frame 202 and vertically pivotable for upward and downward displacement of plow mount assembly 10. Base swivel 14 may have a plow blade 204 fixed thereto. Plow blade 204 may rotate with base swivel 14 during actuation of plow mount system 10, as discussed above. Plow mount assembly 10 therefore provides powered rotation of plow blade 204.

While shown and described as related to plow mount assembly 10, it is understood that power pivot assembly 16 may be used in combination with a variety of other tools pivotally coupled to a mounting structure. For example, power pivot assembly 16 may be used in combination with maintenance equipment such as lawn cutting and sweeping assemblies.

What is claimed is:

1. A pivot assembly comprising:
    a first subassembly adapted to be coupled to a frame member and rotationally fixed relative thereto, said first subassembly including a latch mechanism displaceable between locked and unlocked positions; and
    a second subassembly adapted to be coupled to the frame member and to be rotatable relative thereto, said second subassembly including a power pivot assembly having a gear assembly and a housing with a splined inner surface, and a cam member, said gear assembly engaged with said splined inner surface of said housing and said power pivot assembly drivingly engaged with said cam member and operable to rotate said cam member in a first rotational direction to a first position where said cam member urges said latch mechanism into said unlocked position.

2. The pivot assembly of claim 1, wherein said latch mechanism is biased into engagement with said second subassembly when in said locked position, preventing relative rotation between said first and second subassemblies.

3. The pivot assembly of claim 1, wherein said first subassembly includes a stop member, said cam member engaged with said stop member when in said first position.

4. The pivot assembly of claim 3, wherein said power pivot assembly includes a drive gear and said gear assembly comprises a planetary gear assembly including a cage having a first and second planetary gears rotatably fixed thereto, said drive gear in a driven engagement with said planetary gears.

5. The pivot assembly of claim 4, wherein said cam member is fixed for rotation with said cage.

6. The pivot assembly of claim 5, wherein said cage is fixed against rotation in said first direction when said cam member is in said first position.

7. The pivot assembly of claim 4, wherein said planetary gear assembly is meshingly engaged with said splined inner surface, said cage rotates in said first rotational direction relative to said first subassembly until said cam member is in said first position and said gear housing rotates in a second rotational direction opposite said first rotational direction after said cam member is in said first position.

8. The pivot assembly of claim 7, wherein said gear housing is rotationally fixed to a rotating member.

9. A pivot assembly comprising:
    a rotating member adapted to be rotatably coupled to a frame member;
    a latch mechanism adapted to be coupled to the frame member and displaceable between first and second positions, said latch mechanism engaged with said rotating member when in said first position, preventing relative rotation between said rotating member and the frame member, and disengaged from said rotating member when in said second position, allowing relative rotation between said rotating member and the frame member; and
    a power pivot assembly including a drive assembly drivingly coupled to said rotating member and operable to displace said latch mechanism between said first and second positions, wherein said power pivot assembly includes a motor, a planetary gear assembly including a planetary gear set rotatably coupled to a cage and in a driven engagement with said motor, and a housing having a splined inner surface engaged with said planetary gear set.

10. The pivot assembly of claim 9, further comprising a cam member in a driven engagement with said drive assembly, said cam member rotatable to an engaged position wherein said cam member engages said latch mechanism and displaces said latch mechanism to said second position.

11. The pivot assembly of claim 10, further comprising a stop member adapted to be rotationally fixed relative to the frame member, said cam member engaging said stop member when in said engaged position.

12. The pivot assembly of claim 9, wherein said rotating member is fixed for rotation with said housing.

13. The pivot assembly of claim 9, wherein said housing is adapted to be fixed relative to the frame member and said planetary gear set is driven along said splined inner surface of said housing for rotating said cage in a first rotational direction when said latch mechanism is in said first position.

14. The pivot assembly of claim 13, wherein said cage is adapted to be rotationally fixed relative to the frame member and said housing is driven by said planetary gear set in a second rotational direction opposite said first rotational direction when said latch mechanism is in said second position.

15. A pivot assembly comprising:
a rotating member adapted to be rotatably coupled to a frame member;
a latch mechanism adapted to be coupled to the frame member and displaceable between first and second positions, said latch mechanism engaged with said rotating member when in said first position to prevent relative rotation between said rotating member and the frame member and disengaged from said rotating member when in said second position to allow relative rotation between said rotating member and the frame member; and
a power pivot assembly including a motor, a planetary gear assembly, and a housing having a splined inner surface, said motor drivingly coupled to said planetary gear assembly and said planetary gear assembly engaged with said splined inner surface, said planetary gear assembly operable to displace said latch mechanism to said second position and to rotate said rotating member relative to the frame member.

16. The pivot assembly of claim 15, wherein said housing is fixed to said rotating member.

17. The pivot assembly of claim 16, wherein said planetary gear assembly is drivingly engaged with said housing.

18. The pivot assembly of claim 15, wherein said planetary gear assembly includes a planetary gear set rotatably coupled to a cage, said cage having a cam member rotationally fixed thereto, said cam member engaged with said latch mechanism and configured to displace said latch mechanism to said second position when rotated in a first rotational direction.

19. The pivot assembly of claim 18, wherein said cage is fixed against further rotation in said first rotational direction when said latch mechanism is in said second position.

* * * * *